(12) United States Patent
Swales et al.

(10) Patent No.: US 8,606,473 B2
(45) Date of Patent: Dec. 10, 2013

(54) ELECTRICALLY ASSISTED VARIABLE-K CONTROL

(75) Inventors: Shawn H. Swales, Canton, MI (US); Hong Yang, Rochester Hills, MI (US); Amanda Luedtke, Berkley, MI (US); Andrew W. Phillips, Rochester, MI (US); Joel M. Maguire, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 386 days.

(21) Appl. No.: 12/954,106

(22) Filed: Nov. 24, 2010

(65) Prior Publication Data

US 2012/0130574 A1 May 24, 2012

(51) Int. Cl.
*G06F 9/00* (2006.01)
(52) U.S. Cl.
USPC ............................ 701/51; 701/54; 701/68
(58) Field of Classification Search
USPC ............................... 701/51, 54, 68
See application file for complete search history.

(56) References Cited

U.S. PATENT DOCUMENTS

| | | | |
|---|---|---|---|
| 7,638,980 B2 * | 12/2009 | Zettel et al. | 320/150 |
| 7,726,430 B2 * | 6/2010 | Yang | 180/242 |
| 7,739,016 B2 * | 6/2010 | Morris | 701/51 |
| 7,758,468 B2 * | 7/2010 | Vafidis et al. | 477/115 |
| 7,785,229 B2 | 8/2010 | Maddock | |
| 7,803,086 B2 * | 9/2010 | Tabata et al. | 477/3 |
| 7,891,450 B2 * | 2/2011 | Soliman et al. | 180/65.265 |
| 2008/0194381 A1 * | 8/2008 | Maddock | 477/62 |
| 2009/0118944 A1 * | 5/2009 | Heap et al. | 701/54 |

\* cited by examiner

*Primary Examiner* — Hussein A. Elchanti
(74) *Attorney, Agent, or Firm* — Quinn Law Group, PLLC

(57) ABSTRACT

A vehicle includes a transmission, a motor configured to provide a motor torque to the transmission, and an engine configured to provide an engine torque to the transmission. A torque converter is operably disposed between the transmission and the motor, the engine, or both. The torque converter is configured to at least partially transfer at least one of the motor torque and the engine torque to the transmission in accordance with a plurality of k-factors. The torque converter includes a clutch configured to at least partially engage to change the effective k-factor applied by the torque converter. A control processor is configured to blend the plurality of k-factors and at least partially engage the clutch based on the blended k-factor.

17 Claims, 2 Drawing Sheets

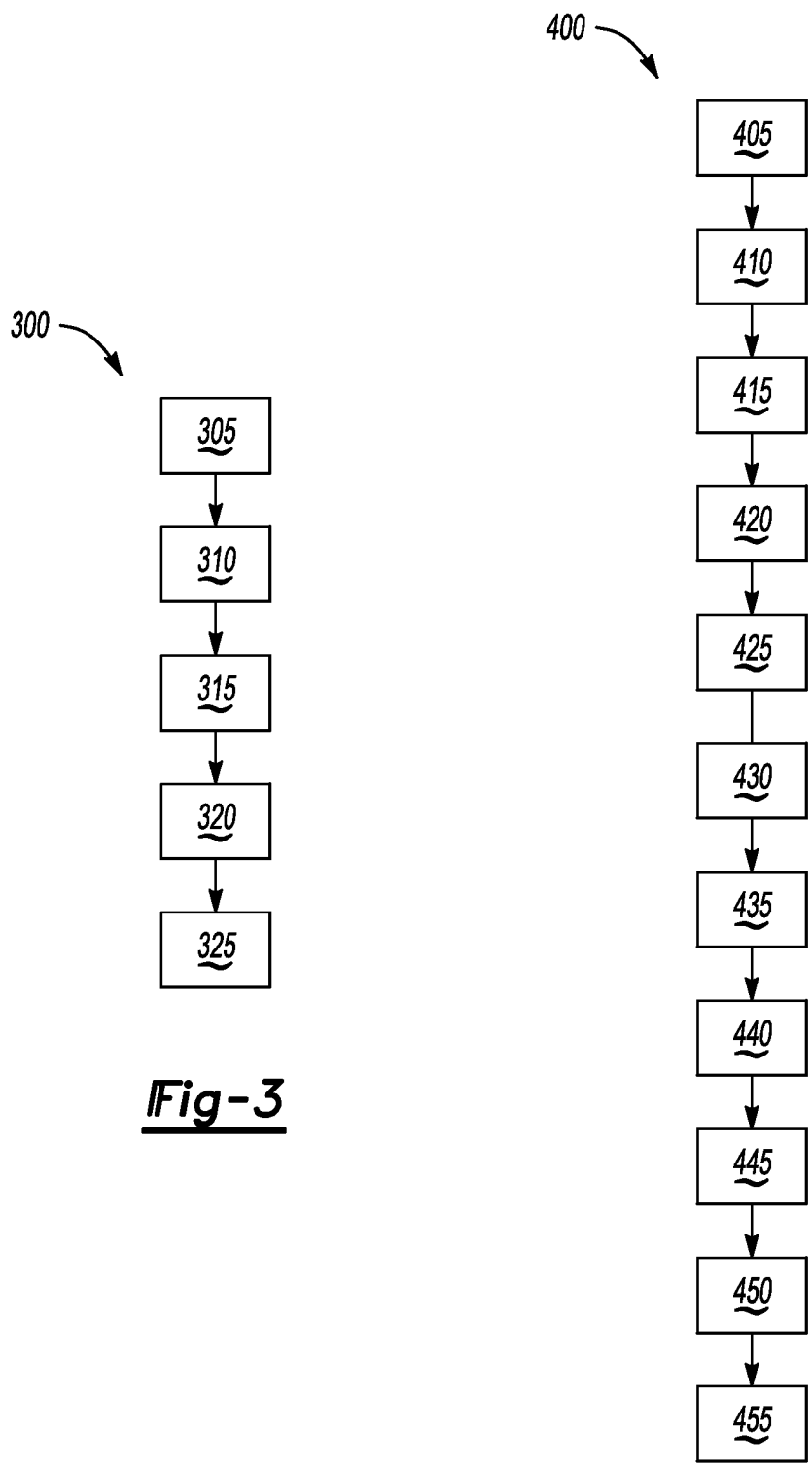

ELECTRICALLY ASSISTED VARIABLE-K CONTROL

TECHNICAL FIELD

The invention relates to an electrically assisted variable-K control in a vehicle.

BACKGROUND

Passenger and commercial vehicles include a transmission that receives a torque from a motor, an engine, or both. In automatic transmissions, a torque converter transfers the engine or motor torque to the transmission. The torque converter provides an initial amount of slip that gradually reduces over time. This operating characteristic of the torque converter is referred to as the k-factor of the torque converter. The k-factor affects the way the vehicle feels to a driver. That is, the amount of time it takes for the vehicle to accelerate in response to the driver pushing an accelerator pedal is determined by the k-factor of the torque converter. However, the k-factor associated with the torque converter may lead to inefficiencies during launch.

SUMMARY

A vehicle includes a transmission, a motor configured to provide a motor torque to the transmission, and an engine configured to provide an engine torque to the transmission. A torque converter is operably disposed between the transmission and at least one of the motor and the engine. The torque converter is configured to at least partially transfer at least one of the motor torque and the engine torque to the transmission in accordance with a plurality of k-factors. The torque converter includes a clutch configured to at least partially engage to change an effective k-factor of the torque converter. A control processor is configured to blend the plurality of k-factors and at least partially engage the clutch based on the blended k-factor.

A method of varying an effective k-factor of a torque converter includes receiving a pedal position, blending a plurality of effective k-factors based on the pedal position, and controlling the torque converter to transfer torque to a transmission in accordance with the blended k-factor.

A system includes a pedal position sensor configured to generate a pedal position signal, a speed sensor configured to generate a speed signal, and a control processor in communication with the pedal position sensor and the speed sensor. The control processor is configured to receive the pedal position signal and the speed signal, blend a plurality of k-factors based on the pedal position signal and the speed signal, and generate a clutch command signal. The control processor is also configured to output the clutch command signal to a clutch to at least partially engage the clutch in accordance with the blended k-factor.

The implementations of the systems and methods described herein can be used, for instance, in a vehicle to vary the effective k-factor of a torque converter.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 illustrates a flowchart of a process that may be used by the system of FIG. 1.

FIG. 4 illustrates a flowchart of another process that may be used by the system of FIG. 1.

DETAILED DESCRIPTION

A vehicle is provided that includes a torque converter with a variable effective k-factor. The k-factor may be the input speed (e.g., in rotations per minute, RPM) at which a torque converter generates a back-torque of 1 Nm. The torque may increase with the square of speed. In one possible implementation, the vehicle includes a transmission, a motor, and an engine. The torque converter is configured to provide a motor torque to a transmission based on a motor-only k-factor when only the motor provides a torque to the transmission. The torque converter is further configured to provide an engine torque to the transmission based on an engine-only k-factor when only the engine provides a torque to the transmission. However, during times when both the motor and engine provide a torque to the transmission, a control processor is configured to blend the motor-only k-factor and the engine-only k-factor and control the torque converter in accordance with the blended k-factor. For instance, the torque converter may include a clutch, and the control processor may be configured to control the operation of the clutch in a way that changes the k-factor of the torque converter. As such, the control processor may use the clutch to vary the effective k-factor of the torque converter.

When used in a vehicle, the system and methods described herein allow the torque convertor to operate under different k-factors depending on the speed and pedal position of the vehicle. For instance, when travelling at low speeds, only the motor may provide the torque converter with the torque, and thus, the torque converter may operate in accordance with a motor-only k-factor. When travelling at higher speeds, only the engine may provide the torque converter with the torque. Thus, the torque converter may operate in accordance with an engine-only k-factor. At intermediate speeds, both the engine and motor may provide the torque to the torque converter. As such, the torque converter may operate in accordance with the blended k-factor. The effective k-factor may be changed at any time, such as when the source of the torque changes, as the speed of the vehicle changes, or as the pedal position changes.

Figure 1:
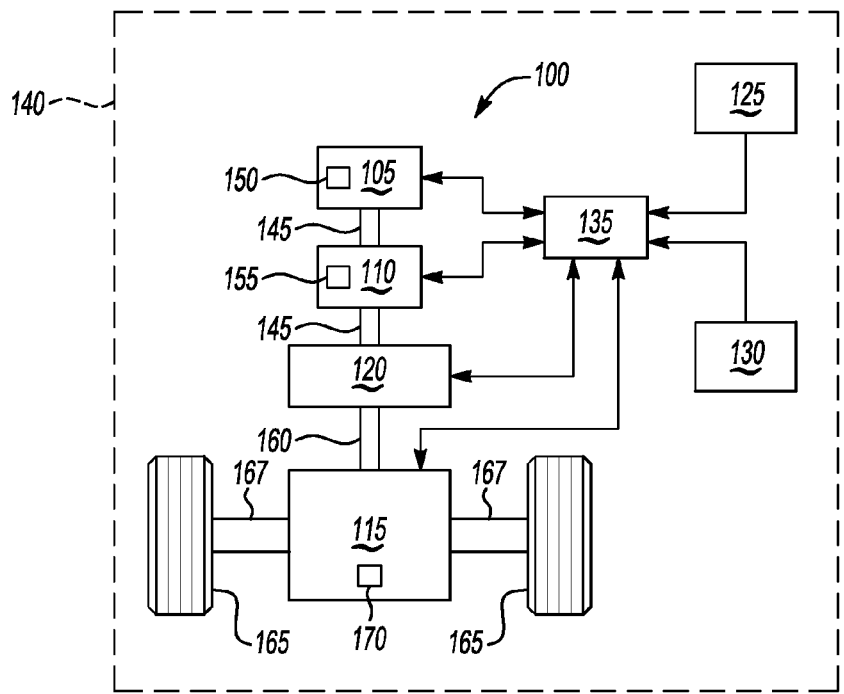
FIG. 1 is a schematic diagram of a system that may be implemented in a vehicle.

FIG. 1 illustrates a system 100 that is able to vary the k-factor of a torque converter to, for instance, reduce inefficiencies during launch. The system 100 may take many different forms and include multiple and/or alternate components and facilities. While a system 100 is shown in the Figures, the components illustrated in the Figures are not intended to be limiting. Indeed, additional or alternative components and/or implementations may be used.

In one example approach, the system 100 includes an engine 105, a motor 110, a transmission 115, a torque converter 120, a speed sensor 125, a pedal position sensor 130, and a control processor 135. The system 100 may be implemented in a vehicle 140, which may include a passenger or commercial automobile. Further, the system 100 may be implemented in a hybrid electric vehicle including a plug-in hybrid electric vehicle (PHEV) or an extended range electric vehicle (EREV), a gas-powered vehicle, a battery electric vehicle (BEV), or the like.

The engine 105 may include any device configured to burn a fuel to generate a torque (e.g., an engine torque). For instance, the engine 105 may include an internal combustion engine. The engine 105 may rotate a crankshaft 145 that provides the torque generated by the engine 105. The torque provided by the engine 105 may be controlled by an engine control unit 150. That is, the engine control unit 150 may generate control signals that command the engine 105 to generate the torque.

The motor 110 may include any device configured to convert electrical energy into a torque (e.g., a motor torque). The motor 110 may be powered by one or more batteries (not shown). The motor 110 may further include a crankshaft 145 that provides the torque generated by the motor 110. The motor 110 may alternatively or additionally serve as a generator under certain circumstances. The torque provided by the motor 110 may be controlled by a motor control unit 155.

The transmission 115 may include any device configured to receive the torque generated by the engine 105, the motor 110, or both. For instance, the transmission 115 may receive the torque via an input shaft 160. The transmission 115 may include a plurality of gears, and the transmission 115 may be configured to change the engagement of the plurality of gears to, for instance, change the speed of rotation and torque provided by the engine 105 and/or motor 110. The gears may be selected by a driver of the vehicle 140 using, for instance, a gear shifter. The transmission 115 may output a torque to, for instance, wheels 165 of the vehicle 140 via an output shaft 167. The transmission 115 may include a transmission control unit 170 configured to control the operation of the transmission 115.

The torque converter 120 may include any device configured to provide an interface between the transmission 115 and the engine 105, the motor 110, or both. Accordingly, the torque converter 120 may be operably connected to the crankshaft 145 of the engine 105, the motor 110, or both and also operably connected to an input shaft 160 of the transmission 115. The torque converter 120 may be used with an automatic transmission to, for example, transfer the engine and/or motor torque to the input shaft 160 of the transmission 115. The torque converter 120 can provide torque in accordance with a plurality of k-factors. The k-factor describes an operating characteristic of the torque converter 120. Namely, the k-factor may be the input speed (e.g., in rotations per minute, RPM) at which the torque converter 120 generates a back-torque of 1 Nm. The torque may increase with the square of speed. For example, the engine 105 must generate 100 Nm of torque to maintain 2000 RPM driving a stalled 200K torque converter 120 since $(2000/200)^2=100$. Because k-factor varies with speed ratio across the torque converter, the torque converter may be specified by its "stall" k-factor (e.g., its zero output speed). Accordingly, the k-factor may be varied, as discussed in greater detail below with respect to FIGS. 2-4.

The speed sensor 125 may include any device configured to measure a speed of the vehicle 140. The speed sensor 125 may directly measure the speed of the vehicle 140 by measuring a rotational speed of one or more wheels 165 or by measuring the rotational speed of one or more axles, including the output shaft 167. Of course, the speed sensor 125 may alternatively be configured to derive the speed of the vehicle 140 based on the engine 105 or motor 110 speed (e.g., measured from the crankshaft 145) and the gear selection. The speed sensor 125 may further be configured to output a speed signal representative of the measured speed.

The pedal position sensor 130 may include any device configured to measure a position of a pedal (not shown) and output a pedal position signal representative of the measured pedal position. For instance, the pedal position sensor 130 may be operatively disposed on or near an accelerator pedal within a cavity of the vehicle 140. The position of the pedal may indicate an actual or intended throttle position as designated by the driver of the vehicle 140. As such, the pedal position signal may be used to determine whether the driver intends for the speed of the vehicle 140 to increase, decrease, or remain the same.

The control processor 135 may include any device configured to control the operation of one or more components in the vehicle 140. For instance, the control processor 135 may be configured to receive the speed signal from the speed sensor 125 and the pedal position signal from the pedal position sensor 130 and generate torque commands to control the torques provided by the motor 110 and the engine 105. Moreover, the control processor 135 may be configured to vary the k-factor of the torque converter 120, as discussed in greater detail below with respect to FIGS. 2-4.

In one example approach, the control processor 135 may be configured to control the motor torque output by the motor 110. For instance, the control processor 135 may be configured to determine the driver's intention for controlling the vehicle 140 based on the measured speed of the vehicle 140 and the position of the pedal. For instance, the control processor 135 may compare the measured speed and the measured pedal position to a database to interpret how the driver would like the vehicle 140 to operate. That is, the control processor 135 may use the measured speed and measured pedal position to determine what torque the driver would like applied to an axle or the wheels 165 (e.g., a requested axle torque). The control processor 135 may be configured to input the requested axle torque and the current gear arrangement in the transmission 115 (e.g., the selected gear) and output a desired transmission input torque command, which represents the desired torque provided to the transmission 115 from the engine 105 and/or motor 110 through torque converter.

The control processor 135 may be further configured to use the desired transmission input torque to determine a desired crankshaft torque (e.g., the torque provided to the torque converter 120). In an alternative implementation, the control processor 135 need not determine desired transmission input torque to determine the desired crankshaft torque. Instead, the control processor 135 may compare the speed of the vehicle 140 and the pedal position to a pedal progression table, and determine a throttle position setting based on the speed and pedal position. The control processor 135 may further compare the throttle position setting and the engine 105 speed to an engine map to determine a desired crankshaft torque (e.g., the torque provided to the torque converter 120). Accordingly, the desired crankshaft torque may be determined from the pedal position signal and the speed signal. The control processor 135 may be configured to generate a motor torque command based on the desired crankshaft torque and control the motor 110 to generate the motor torque using the motor torque command. In addition or as an alternative approach, the control processor 135 may be configured to generate an engine torque command based on the desired crankshaft torque and control the engine 105 to generate the engine torque using the engine torque command.

In general, computing systems and/or devices, such as the control processor 135, the engine control unit 150, the motor control unit 155, and the transmission control unit 170, may employ any of a number of computer operating systems and generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission 115 media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
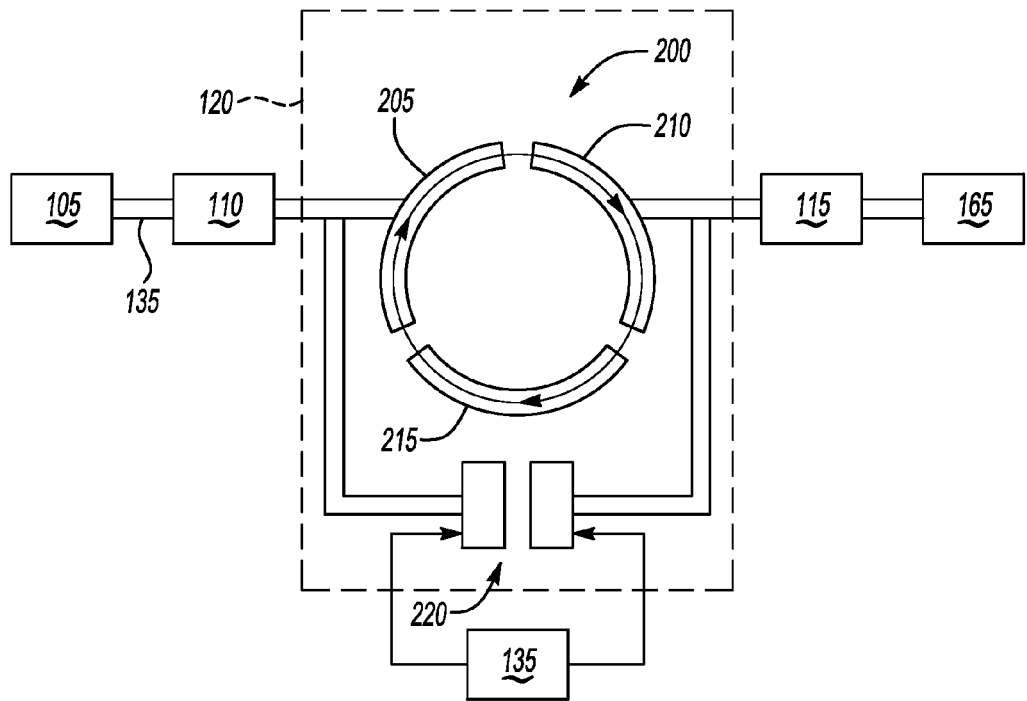
FIG. 2 is a schematic diagram of an exemplary torque converter and control processor that may be used with the system illustrated in FIG. 1.

Referring to FIG. 2, the torque converter 120 may include a hydraulic device 200 that operates when provided with a fluid. For instance, the torque converter 120 may include an impeller 205, a turbine 210, and a stator 215. The impeller 205 may be operably connected to the crankshaft 145 of the engine 105, the motor 110, or both. The impeller 205 may be configured to rotate at the same speed as the crankshaft 145. The rotation of the impeller 205 may cause the fluid to flow to the turbine 210. As such, the turbine 210 may be operably connected to the impeller 205. That is, the rotation of the impeller 205 may cause the fluid to rotate the turbine 210. The rotation of the turbine 210 may cause the input shaft 160 to rotate. The stator 215 may be used to direct fluid from the turbine 210 back to the impeller 205, which may result in torque multiplication depending on the physical configuration of the torque converter 120.

The torque converter 120 may further include a clutch 220. The clutch 220 may include any friction element that, when engaged, transfers the torque provided by the crankshaft 145 to the input shaft 160. For instance, the clutch 220 may include a driving mechanism operably connected to the crankshaft 145 and a driven mechanism operably connected to the input shaft 160. When fully engaged, the driving mechanism and driven mechanism rotate at substantially the same speeds, causing the crankshaft 145 and the input shaft 160 to rotate at substantially the same speeds. In one possible implementation, the driving mechanism may include teeth configured to interface with teeth of the driven mechanism.

As mentioned above, the torque converter 120 may have a k-factor, which is an operating characteristic defined by a stall speed divided by a square root of the torque provided by the impeller 205. The stall speed may be the minimum speed of the impeller 205 that causes the turbine 210 to rotate, and the torque component of the k-factor is the amount of torque provided by the impeller 205 at the stall speed. While the k-factor of the torque converter 120 is generally a hardware characteristic (e.g., a characteristic based on the physical configuration and features of the components that make up the torque converter 120), the effective k-factor can be changed using the clutch 220. In one example implementation, at least partially engaging the clutch 220 at various times may change the stall speed and torque in the k-factor equation. Accordingly, at least partially engaging the clutch 220 may change the effective k-factor of the torque converter 120. Various factors may be used to determine how to vary the k-factor, as described in greater detail below.

The control processor 135 may be configured to control the operation of the clutch 220 based on a desired k-factor. Accordingly, the control processor 135 may be configured to control the clutch 220 in a way that the torque converter 120 applies the motor torque to the transmission 115 in accordance with a motor-only k-factor and the engine torque to the transmission 115 in accordance with an engine-only k-factor. Additionally, the control processor 135 may be configured to blend a plurality of k-factors, such as the motor-only k-factor and the engine-only k-factor, and control the clutch 220 based on the blended k-factor. For instance, the control processor 135 may control the clutch 220 based on the blended k-factor when both the motor 110 and the engine 105 provide a torque to the torque converter 120. As discussed above, the control processor 135 may vary the k-factor of the torque converter 120 by at least partially engaging the clutch 220. That is, the control processor 135 may be configured to control a slip across the clutch 220 based on the blended k-factor.

In one example approach, the control processor 135 may be configured to receive the pedal position signal representing the position of the accelerator pedal, and blend the plurality of k-factors based on the pedal position signal. That is, the control processor 135 may determine whether to apply torque from the motor 110, the engine 105, or both, based on the pedal position. If the control processor 135 determines that torque should be applied from both the motor 110 and the engine 105, the control processor 135 may select a new k-factor that blends the motor-only k-factor and the engine-only k-factor.

To blend the plurality of k-factors, the control processor 135 may be configured to weigh each k-factor and select the blended k-factor based on the weighting factor applied. For instance, the control processor 135 may be configured to consider the torque provided by the motor 110 at a given time and the torque provided by the engine 105 at a given time. If the motor torque and engine torque are substantially equal to one another, the control processor 135 may be configured to weigh the motor-only k-factor and the engine-only k-factor equally. Thus, the blended k-factor may be an average of the motor-only k-factor and the engine-only k-factor. Alternatively, the control processor 135 may be configured to weigh one of the k-factors greater than the other. For example, the control processor 135 may be configured to determine a percentage of the motor-only k-factor relative to the engine-only k-factor, and blend the k-factors in accordance with that percentage. For instance, if the motor-only k-factor is below a predetermined percentage of the engine-only k-factor, the control processor 135 may give the motor-only k-factor little weight. Thus, the blended k-factor may be substantially equal to the engine-only k-factor. If, however, the motor-only k-factor is a large percentage of the engine-only k-factor, the control processor 135 may be configured to weigh the motor-only k-factor greatly. Indeed, the blended k-factor may be substantially equal to the motor-only k-factor.

Once the control processor 135 has determined the blended k-factor, the control processor 135 may be configured to control the torque transferred to the transmission 115 based on the blended k-factor. That is, the control processor 135 is configured to generate the clutch command signal that controls the engagement of the clutch 220 based on the blended k-factor. Using the clutch command signal, the control processor 135 may at least partially engage the clutch 220 based on the blended k-factor. As the clutch 220 becomes more fully engaged, more torque is transferred to the transmission 115 through the clutch 220, which changes the k-factor of the torque converter 120.

FIG. 3 is a flowchart of a process 300 that may be implemented by the system 100 of FIG. 1 to vary the k-factor associated with the torque converter 120.

At block 305, the system 100 may receive the speed of the vehicle 140. For instance, the speed sensor 125 may measure the speed of the vehicle 140, generate the speed signal that represents the measured speed, and output the speed signal to the control processor 135.

At block 310, the system 100 may receive the pedal position. For example, the pedal position sensor 130 may determine the position of the pedal, generate the pedal position signal that represents the measured position, and output the pedal position signal to the control processor 135.

At block 315, the system 100 may blend the plurality of k-factors based on the pedal position. In one example approach, the control processor 135 may determine whether to apply the motor torque, the engine torque, or both, to the torque converter 120. If both, the control processor 135 may weigh the k-factor associated with the torque converter 120 when receiving only the motor torque (e.g., the motor-only k-factor) and the k-factor associated with the torque converter 120 when receiving only the engine torque (e.g., the engine-only k-factor). The blended k-factor may be the result of the weighted motor-only k-factor and the weighted engine-only k-factor.

At block 320, the system 100 may generate a command signal to control the torque converter 120. For example, the torque converter 120 may include the clutch 220. Accordingly, the control processor 135 may generate a clutch command signal based on the speed of the vehicle 140 and the blended k-factor.

At block 325, the system 100 may control the torque converter 120 to transfer torque to the transmission 115 in accordance with the blended k-factor. That is, the control processor 135 may output the clutch command signal to the clutch 220. In response to receiving the clutch command signal, the clutch 220 may at least partially engage. The amount that the clutch 220 engages may be dictated by the clutch command signal. For instance, if the blended k-factor requires that the torque converter 120 transfer torque to the transmission 115 with substantially no slip, the clutch command signal may command that the clutch 220 be substantially engaged. As such, the clutch command signal may be used to control the slip across the torque converter 120.

FIG. 4 illustrates a flowchart of another process 400 that may be implemented by the system 100 to vary the k-factor associated with the torque converter 120.

At block 405, the system 100 may receive the speed of the vehicle 140. For instance, the speed sensor 125 may measure the speed of the vehicle 140, generate the speed signal that represents the measured speed, and output the speed signal to the control processor 135.

At block 410, the system 100 may receive the pedal position. For example, the pedal position sensor 130 may determine the position of the pedal, generate the pedal position signal that represents the measured position, and output the pedal position signal to the control processor 135.

At block 415, the system 100 may consider the driver's intention for controlling the vehicle 140 based on the speed of the vehicle 140 and the pedal position. For instance, the control processor 135 may compare the measured speed and the measured pedal position to a database to interpret how the driver would like the vehicle 140 to operate. That is, the control processor 135 may use the measured speed and measured pedal position to determine what torque the driver would like applied to an axle or the wheels 165 (e.g., a requested axle torque). Alternatively, the control processor 135 may compare the speed of the vehicle 140 and the pedal position to a pedal progression to determine a throttle position setting. The control processor 135 may compare the throttle position setting and a speed of the engine 105 to an engine map to determine the desired crankshaft torque. As such, the system 100 may bypass blocks 420 and 425 below. If, however, the system 100 determines the driver's intention to determine the requested axle torque, the process 400 may continue with block 420 below.

At block 420, the system 100 may determine the desired transmission input torque. For instance, the control processor 135 may compare the requested axle torque identified at block 415 to the current gear arrangement in the transmission 115 (e.g., the selected gear) and output the desired transmission input torque command, which represents the desired torque provided to the transmission 115 from the engine 105 and/or motor 110.

At block 425, the system 100 may determine the desired crankshaft torque (e.g., the torque provided to the torque converter 120). For instance, the control processor 135 may use the desired transmission input torque to determine the desired crankshaft torque. As such, the desired crankshaft torque may be determined from the pedal position signal and the speed signal. The control processor 135 may further consider the current state of the torque converter 120 when determining the desired crankshaft torque. That is, the control processor 135 may consider the current torque converter 120 slip speed and an estimate of the pressure applied to the clutch 220, which may be an indication of the amount that the clutch 220 is engaged, to determine the desired crankshaft torque.

At block 430, the system 100 may determine a torque split optimization. That is, the control processor 135 may determine how much torque should be applied to the transmission 115 from the motor 110, the engine 105, or both.

At block 435, the system 100 may generate the motor torque command and the engine torque command. The control processor 135 may generate the motor torque command based on the desired crankshaft torque and output the motor torque command to the motor control unit 155 to control the motor 110 to generate the motor torque using the motor torque command. In addition or as an alternative approach, the control processor 135 may generate the engine torque command based on the desired crankshaft torque and output the engine torque command to the engine control unit 150 to control the engine 105 to generate the engine torque using the engine torque command.

At block 440, the system 100 may blend the plurality of k-factors. For instance, the control processor 135 may blend the motor-only k-factor with the engine-only k-factor to derive the blended k-factor. In one example implementation, the control processor 135 may be configured to weigh each k-factor and select the blended k-factor based on the weighting factor applied. For instance, the control processor 135 may be configured to consider the torque provided by the motor 110 at a given time and the torque provided by the engine 105 at a given time. The control processor 135 may be configured to determine a percentage of the motor-only k-factor relative to the engine-only k-factor, and blend the k-factors in accordance with that percentage. For instance, if the motor-only k-factor is below a predetermined percentage of the engine-only k-factor, the control processor 135 may give the motor-only k-factor little weight. Thus, the blended k-factor is substantially the engine-only k-factor in that instance. If, however, the motor-only k-factor is a large percentage of the engine-only k-factor, the control processor 135 may be configured to weigh the motor-only k-factor greatly. In this instance, the blended k-factor may be substantially the motor-only k-factor.

At block 445, the system 100 may determine the speed of the impeller 205. For instance, the control processor 135 may derive the speed of the impeller 205 from the desired speed of the crankshaft 145 and the blended k-factor.

At block 450, the system 100 may generate the clutch command signal. In one example approach, the control processor 135 may compare the speed of the impeller 205 determined at block 445 to the speed of the turbine 210 to determine the slip between the impeller 205 and turbine 210. With the slip, the control processor 135 may determine a slip ratio. The control processor 135 may use a look-up table or a database to determine a desired torque ratio based on the slip ratio. The control processor 135 may use the desired torque ratio and the desired transmission input torque determined at block 420, as well as consider an output from an electronically controlled capacity clutch 220 to generate the clutch command signal.

At block 455, the system 100 may output the clutch command signal. For instance, the control processor 135 may output the clutch command signal to control the engagement of the clutch 220. As discussed above, the engagement of the clutch 220 may be used to vary the effective k-factor of the torque converter 120. Accordingly, the control processor 135 may at least partially engage the clutch 220 based on the blended k-factor selected at block 440. In doing so, the control processor 135 may vary the effective k-factor of the torque converter 120.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a transmission having an input member;
a motor configured to provide a motor torque to the input member of the transmission;
an engine having a crankshaft, wherein the engine is configured to provide an engine torque to the transmission via the crankshaft;
a pedal position sensor which generates a pedal position signal;
a torque converter operably disposed between the transmission and at least one of the motor and the engine, wherein the torque converter has an effective k-factor, and is configured to at least partially transfer at least one of the motor torque and the engine torque to the transmission in accordance with a plurality of k-factors, and wherein the torque converter includes a torque converter clutch configured to fully engage to cause the crankshaft and the input shaft to rotate at the same speed, and to at least partially engage to change the effective k-factor of the torque converter in response to a clutch command signal; and
a control processor in communication with the pedal position sensor and configured to blend the plurality of k-factors based on the pedal position signal to generate a blended k-factor as the effective k-factor, and at least partially engage the torque converter clutch via the clutch command signal to achieve the blended k-factor.

2. A vehicle as set forth in claim 1, wherein:
the plurality of k-factors includes a motor-only k-factor and an engine-only k-factor;
the torque converter is configured to transfer the motor torque to the transmission in accordance with a motor-only k-factor and transfer the engine torque to the transmission in accordance with an engine-only k-factor; and
the control processor is configured to blend the motor-only k-factor and the engine-only k-factor to thereby generate a blended k-factor.

3. A vehicle as set forth in claim 2, wherein the control processor is configured to blend the motor-only k-factor and the engine-only k-factor when the transmission receives the motor torque and the engine torque.

4. A vehicle as set forth in claim 1, wherein the control processor is configured to control a slip across the torque converter clutch in accordance with the blended k-factor.

5. A vehicle as set forth in claim 1, wherein the control processor is configured to determine a desired crankshaft torque and generate a motor torque command based on the desired crankshaft torque.

6. A vehicle as set forth in claim 5, wherein the control processor is configured to control the motor torque using the motor torque command.

7. A vehicle as set forth in claim 1, wherein the control processor is configured to determine a desired crankshaft torque and generate an engine torque command based on the desired crankshaft torque.

8. A vehicle as set forth in claim 7, wherein the control processor is configured to control the engine torque using the engine torque command.

9. A vehicle as set forth in claim 1, wherein the control processor is configured to control the motor torque and the engine torque transferred to the transmission based on the blended k-factor.

10. A vehicle as set forth in claim 1, wherein the control processor is configured to generate a clutch command signal based on the blended k-factor to control the clutch.

11. A vehicle as set forth in claim 1, further comprising a speed sensor configured to measure a speed of a vehicle.

12. A vehicle as set forth in claim 11, wherein the control processor is configured to determine a driver intention based on the measured speed of the vehicle and the position of the pedal.

13. A method of varying an effective k-factor of a torque converter in a vehicle having an engine, the torque converter, a transmission, and a control processor, wherein the torque converter includes a torque converter clutch responsive to clutch command signal from the control processor, and wherein the torque converter clutch fully engages to cause a crankshaft of the engine and an input shaft of the transmission to rotate at the same speed, the method comprising:
receiving a pedal position via the control processor;
blending a plurality of k-factors based on the pedal position to form a blended k-factor as the effective k-factor, wherein the plurality of k-factors includes a motor-only k-factor and an engine-only k-factor, including assigning relative weights to each of the motor-only k-factor and the engine-only k-factor; and
controlling the torque converter clutch, via the clutch command signal and at least partial engagement of the torque converter clutch, to thereby transfer torque to a transmission as a function of the blended k-factor.

14. A method as set forth in claim 13, wherein controlling the torque converter includes outputting the clutch command signal to the torque converter to control the slip across the torque converter clutch.

15. A method as set forth in claim 14, wherein controlling the torque converter includes outputting the clutch command signal to the torque converter clutch to at least partially engage the torque converter clutch in accordance with the blended k-factor.

16. A system for a vehicle having an engine, a motor, a torque converter, a transmission, and a control processor, wherein the torque converter includes a torque converter clutch positioned such that engagement of the torque converter clutch causes a crankshaft of the engine and an input shaft of the transmission to rotate at the same speed, the system comprising:
- a pedal position sensor configured to generate a pedal position signal;
- a speed sensor configured to generate a speed signal; and
- a control processor in communication with the pedal position sensor and the speed sensor and configured to receive the pedal position signal and the speed signal, wherein the control processor is configured to blend a plurality of k-factors of the torque converter, including a motor-only k-factor and an engine-only k-factor, into a blended k-factor based on the pedal position signal and the speed signal, and to generate a clutch command signal based on the speed of the vehicle and the blended k-factor;
- wherein the control processor is configured to output the clutch command signal to the torque converter clutch to at least partially engage the torque converter clutch, and to thereby transfer torque across the torque converter clutch as a function of the blended k-factor.

17. A system as set forth in claim 16, wherein the control processor is configured to generate a motor torque command signal to control a motor and an engine torque command signal to control an engine, wherein the control processor is configured to generate the motor torque command signal and the engine torque command signal based on the pedal position signal and the speed signal, a desired crankshaft torque, and a torque split optimization.

* * * * *